US009030042B2

(12) United States Patent
Zhan et al.

(10) Patent No.: US 9,030,042 B2
(45) Date of Patent: May 12, 2015

(54) POWER TRANSMISSION AND DISTRIBUTION SYSTEMS

(75) Inventors: Changjiang Zhan, Warwickshire (GB); Allan David Crane, Gwynedd (GB); Andrew James Bullock, Leicestershire (GB)

(73) Assignee: GE Energy Power Conversion Technology Ltd., Warwickshire (GB)

( * ) Notice: Subject to any disclaimer, the term of this patent is extended or adjusted under 35 U.S.C. 154(b) by 575 days.

(21) Appl. No.: 13/391,930

(22) PCT Filed: Sep. 6, 2010

(86) PCT No.: PCT/EP2010/005465
§ 371 (c)(1),
(2), (4) Date: Jun. 1, 2012

(87) PCT Pub. No.: WO2011/029566
PCT Pub. Date: Mar. 17, 2011

(65) Prior Publication Data
US 2012/0267955 A1    Oct. 25, 2012

(30) Foreign Application Priority Data
Sep. 8, 2009 (EP) .................................... 09011456

(51) Int. Cl.
*H02J 1/00* (2006.01)
*H02J 3/14* (2006.01)
*H02J 1/06* (2006.01)
*H02J 3/36* (2006.01)
*H02M 3/335* (2006.01)
*H02M 1/00* (2006.01)

(52) U.S. Cl.
CPC .... *H02J 1/06* (2013.01); *H02J 3/36* (2013.01); *H02M 3/3353* (2013.01); *H02M 2001/0074* (2013.01); *Y02E 60/60* (2013.01)

(58) Field of Classification Search
CPC ............... H02J 3/36; H02J 3/00; H02J 3/005; H02J 5/00; Y02E 60/60; H02M 2001/0074
USPC ........................................................ 307/31, 38
See application file for complete search history.

(56) References Cited

U.S. PATENT DOCUMENTS

2005/0029476 A1 * 2/2005 Biester et al. .................... 251/58
2010/0133901 A1 * 6/2010 Zhang et al. ..................... 307/11

FOREIGN PATENT DOCUMENTS

| DE | 10205261 A1 | 8/2003 |
| EP | 2071694 A1 | 6/2009 |
| WO | 01/84689 A1 | 11/2001 |

OTHER PUBLICATIONS

De Doncker R W et al: "Power Electronics for Future Utility Applications," Power Electronics and Drive Systems, 2007. PEDS '07. 7th International Conference on, IEEE, Piscataway, NJ, USA, Nov. 27, 2007, p. K-1, XP031242476, ISBN: 978-1-4244-0644-0, Chapter IV: HVDC/MVDC Transmission and Distribution.

(Continued)

*Primary Examiner* — Carlos Amaya
(74) *Attorney, Agent, or Firm* — Parks Wood LLC

(57) ABSTRACT

A power transmission and distribution system suitable for subsea electrical loads includes a primary dc transmission cable connected to an onshore AC/DC converter module that connects the onshore end of the cable to an ac supply network. The subsea end of the cable is connected to a primary subsea power distribution unit and includes a DC/DC converter module having a modular topology with a series of interconnected DC/DC converter units. The DC/DC converter module is connected between the cable and a primary dc distribution network. Secondary dc transmission cables and associated circuit breakers connect the primary subsea power distribution unit to secondary subsea power distribution units that are located near the subsea loads. Each secondary subsea power distribution unit includes a DC/DC converter module having a modular topology with a series of interconnected DC/DC converter units. Respective secondary dc distribution networks supply power to one or more subsea loads.

13 Claims, 3 Drawing Sheets

(56) References Cited

OTHER PUBLICATIONS

Jie Chen et al. "Design of DC Architecture for Large-Scale Non-Grid-Connected Wind Power Generation System," Power and Energy Engineering Conference, 2009. APPEEC 2009. Asia Pacific, IEEE, Piscataway, NJ, USA, Mar. 27, 2009, p. 1-5, XP031454753, ISBN: 978-1-4244-2486-3, The Whole Document.

ABB: "Deepwater Seminar Power Transmission and Distribution for Subsea Applications," Internet Citation, Jun. 18, 2001, p. 1-28, XP002480181, p. 8.

* cited by examiner

POWER TRANSMISSION AND DISTRIBUTION SYSTEMS

FIELD OF THE INVENTION

The present invention relates to power transmission and distribution systems, and in particular to power transmission and distribution systems for subsea power systems and subsea electrical loads.

It will be readily appreciated that any reference herein to "subsea" means those component parts of the power transmission and distribution system that are either partially or completely located in any body of water including oceans, seas, lakes, reservoirs, rivers and other waterways etc. Similarly, any reference herein to "onshore" does not necessarily mean that these component parts must be located on physical land but should also be taken to include offshore and floating platforms, oil and gas rigs and other stationary and moving marine vessels etc.

BACKGROUND OF THE INVENTION

A conventional subsea power transmission and distribution system is typically an ac system with an onshore step-up transformer, an ac transmission cable, one or more subsea step-down transformers, circuit breakers and frequency converters for powering subsea electrical loads such as compressors and pumps. Such conventional subsea power transmission and distribution systems work well for relatively short offshore distances (e.g. 10-20 km) and where the total power rating is within certain limits.

For longer offshore distances then the ac transmission cable will generate a considerably large reactive current due to its high capacitance. For example, a cross-linked polyethylene cable carrying 132 kV can generate a reactive current up to 1000 kVAR/km. This significantly reduces the active power transfer capability of the ac transmission cable as the offshore distance is increased to 100 km or more. A shunt reactor or some form of static voltage compensator is then needed for reactive power compensation and voltage stability control.

When ac transmission cables are no longer appropriate then it is known to use high voltage direct current (HVDC) transmission for offshore applications. The dc transmission cables are less expensive because they can be operated safely at higher current for a given amount of insulation and copper. A dc transmission cable can therefore transmit more power for a given cable expenditure. The losses in the dc transmission cable are also lower because of the lack of charging currents in the main conductor and the induced currents in the shielding. There is also no resonance between the dc transmission cable and the conventional ac equipment that is associated with the ac network or power grid.

An example of a commercially available HVDC power transmission system is the HVDC LIGHT system that is supplied by ABB Ltd of Zurich, Switzerland and which has been used to provide dc power from an onshore station at Kollsnes in Norway to the Troll A oil and gas platform. It uses VSC converters with a pulse width modulation (PWM) strategy to provide decoupled active and reactive power controls. However, high switching losses for high power applications means that the switching frequency of the VSC converters is limited. The HVDC LIGHT system also requires the use of physically large and costly ac filters and a line-frequency transformer. The physical size of the offshore components can be a significant disadvantage in situations where there are practical restrictions on the size of a converter station.

SUMMARY OF THE INVENTION

The present invention provides a power transmission and distribution system comprising: a primary dc transmission cable; a primary subsea power distribution unit (SPDU) having a DC/DC converter module connected between the primary dc transmission cable and a primary dc distribution network; a secondary SPDU having a DC/DC converter module connected between the primary dc distribution network and a secondary dc distribution network; and one or more subsea electrical loads connected to the secondary dc distribution network, optionally by means of a suitable power converter.

Such a power transmission and distribution system would provide an economic solution for providing power from an onshore ac supply network to subsea electrical loads such as pumps, compressors etc. It would be particularly useful for the oil and gas industry where reserves are often found in deep water that is remote from shore or the continental shelf, for example.

An onshore AC/DC converter module preferably acts as an active front end for the power transmission and distribution system to connect it to an onshore ac supply network. The AC/DC converter module is therefore connected between the ac supply network and the primary dc transmission cable. In many situations the ac supply network will be a conventional three-phase transmission grid operating at 132-400 kV, 50/60 Hz but it may also be a dedicated power grid for supplying power to the power transmission and distribution system only. The onshore AC/DC converter module is preferably connected to the ac supply network by suitable protective switchgear that comprises circuit breakers and associated controls. The onshore AC/DC converter module can have any suitable construction or topology such as a conventional rectifier using thyristors like a LCC converter or a VSC HVDC converter, for example.

The primary dc transmission cable carries a high voltage (HV) or medium voltage (MV) transmission voltage to the primary SPDU, i.e. it is an HVDC or MVDC transmission cable. The operating parameters of the power transmission and distribution system will depend to some extent on the performance of the primary dc transmission cable, which can have any suitable construction for subsea use.

The DC/DC converter module of the primary SPDU preferably operates as a step-down converter and can be configured to supply power to the primary dc distribution network at any suitable distribution voltage level. The primary dc distribution network may be in the form of a suitable busbar or switchboard, for example, having a pair of dc lines. Subsea electrical loads may be connected to the primary dc distribution network either directly or by means of any suitable power converter. In the case of dc electrical loads then the power converter can be a DC/DC converter unit having any suitable construction or topology. In the case of ac electrical loads then the power converter can be a DC/AC converter unit having any suitable construction or topology. Each power converter can be connected to a primary dc distribution network by an off-load switch.

The power transmission and distribution system may include any suitable number of secondary SPDUs connected in parallel to the primary dc distribution network. Each secondary SPDU will include a DC/DC converter module that preferably operates as a step-down converter and can be configured to supply power to an associated secondary dc distribution network at any suitable distribution voltage level. The secondary dc distribution networks may be in the form of a suitable busbar or switchboard, for example, having a pair of dc lines. The secondary dc distribution networks may carry different distribution voltages depending on the operating requirements or voltage demands of the subsea electrical loads.

The DC/DC converter module of each secondary SPDU can be connected to the primary dc distribution network of the primary SPDU by means of a secondary dc transmission cable and an associated subsea circuit breaker. This allows the secondary SPDUs to be located close to the subsea electrical loads and to be connected to the primary SPDU in a flexible and reliable manner. The secondary dc transmission cable(s) can have any suitable construction for subsea use and carry a suitable transmission voltage (typically the distribution voltage of the primary dc distribution network) from the primary SPDU to the associated secondary SPDU. The DC/DC converter modules employed in the power transmission and distribution system have inherent overload/short circuit current protection capability arising from the turn-off capability of the gate-controlled semiconductor power devices employed in the DC/AC converter blocks (see below). This means that the subsea circuit breakers that are used to connect the secondary dc transmission cables to the primary dc distribution network can be in the form of physically compact off-load switches instead of full function dc circuit breakers.

The DC/DC converter modules can be either voltage source fed or current source fed and may have any suitable construction or topology. The DC/DC converter modules are preferably resonant DC/DC converter modules. It is generally preferred that the DC/DC converter modules include a series of interconnected DC/DC converter units via series-parallel arrangements. Typically all of the DC/DC converter units will have the same topology so that the DC/DC converter modules benefit from being a modular system with regards to assembly, maintenance and repair. A modular system allows the DC/DC converter modules to be easily matched to the required voltage and power rating for the power transmission and distribution system and provides for additional improvement in redundancy, and hence in the reliability of the overall system.

Each of the interconnected DC/DC converter units preferably includes a transformer, a DC/AC converter block connected to first transformer windings (optionally via a resonant LC tank), and an AC/DC converter block connected to second transformer windings. The transformer provides galvanic isolation and can be a medium- or high-frequency transformer of single-phase or three-phase type, for example. The transformer will normally be significantly more physically compact than a line-frequency transformer with the same power rating. If a medium-frequency transformer is used then the DC/DC converter module will have a very high power density as a result of its operating frequency of about 1-20 kHz.

The DC/AC and AC/DC converter blocks may have also suitable topology such as conventional full-H or half-H bridges employing any suitable power semiconductor switching devices such as IGBTs or conventional diode bridges that provide passive rectification, for example.

The dc input terminals of the DC/AC converter blocks are preferably interconnected together in series.

In the case of the DC/DC converter module for the primary SPDU then a first DC/AC converter block in the series preferably has a first dc terminal connected to a first dc line of the primary dc transmission cable and a second dc terminal that is connected to the first dc terminal of the next DC/AC converter block in the series. Each DC/AC converter block apart from the last DC/AC converter block in the series preferably has a second dc terminal that is connected to a first dc terminal of the next DC/AC converter block in the series and the last DC/AC converter block in the series has a second dc terminal that is connected to a second dc line of the primary dc transmission cable.

In the case of the DC/DC converter module for each secondary SPDU then a first DC/AC converter block in the series preferably has a first dc terminal connected to a first dc line of the primary dc distribution network and a second dc terminal that is connected to the first dc terminal of the next DC/AC converter block in the series. Each DC/AC converter block apart from the last DC/AC converter block in the series preferably has a second dc terminal that is connected to a first dc terminal of the next DC/AC converter block in the series and the last DC/AC converter block in the series has a second dc terminal that is connected to a second dc line of the primary dc distribution network.

The first dc terminal of the first DC/AC converter block in the series can be connected directly to the first dc line of the primary dc distribution network, and the second dc terminal of the last DC/AC converter block in the series can be connected directly to the second dc line of the primary dc distribution network, but these connections are preferably an indirect connection by means of a secondary dc transmission cable and an associated subsea circuit breaker. More particularly, the first dc terminal of the first DC/AC converter block in the series can be connected to a first dc line of the secondary dc transmission cable and the second dc terminal of the last DC/AC converter block in the series can be connected to a second dc line of the secondary dc transmission cable.

The dc output terminals of the AC/DC converter blocks can be interconnected together in parallel.

In the case of the DC/DC converter module for the primary SPDU then each AC/DC converter block in the series preferably has a first dc terminal that is connected to a first dc line of the primary dc distribution network and a second dc terminal that is connected to a second dc line of the primary dc distribution network.

In the case of the DC/DC converter module for each secondary SPDU then each AC/DC converter block in the series preferably has a first dc terminal that is connected to a first dc line of the associated secondary dc distribution network and a second dc terminal that is connected to a second dc line of the associated secondary dc distribution network.

The primary and secondary SPDUs are physically compact, efficient and have the benefits that arise from the use of a modular topology. They can work for different voltage levels and for different power ratings. Most importantly, no line-frequency converter transformers or ac filters are required.

The subsea electrical loads can be pumps, compressors etc. and can be connected to a secondary dc distribution network either directly or by any suitable power converter. In the case of dc electrical loads then the power converter can be a DC/DC converter unit having any suitable construction or topology. In the case of ac electrical loads then the power converter can be a DC/AC converter unit having any suitable construction or topology. Each power converter can be connected to a secondary dc distribution network by an off-load switch.

All electrical connections between components part of the power transmission and distribution system are preferably made using known wet mateable connectors or umbilical termination heads. Where appropriate, associated component parts can be provided as fully integrated units and located within a waterproof housing that is filled with solid insulation material or a liquid dielectric, for example.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
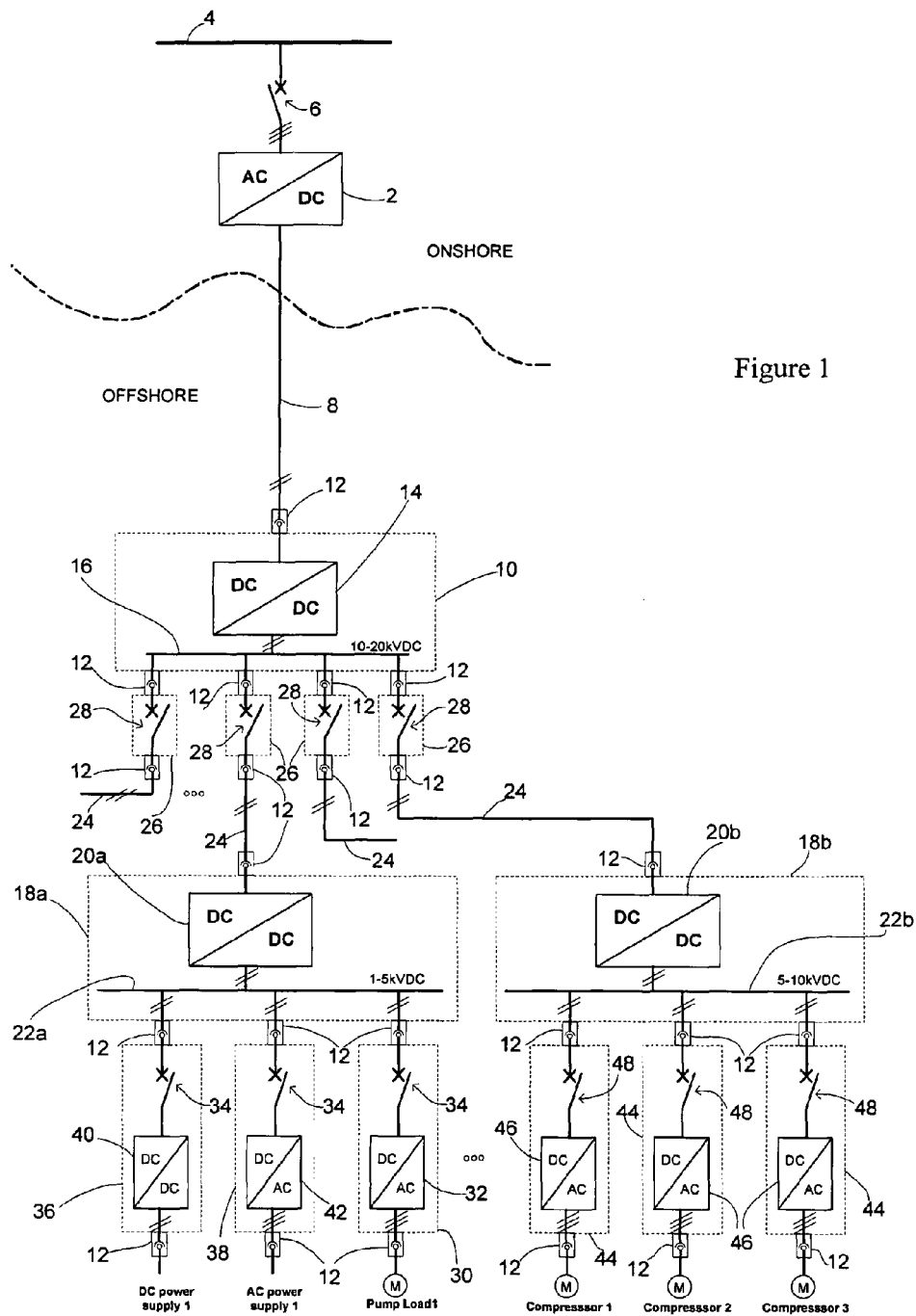
FIG. 1 is a schematic diagram showing a power transmission and distribution system according to the present invention.

A power transmission and distribution system that is suitable for use with subsea electrical loads and power systems will now be described with reference to FIG. 1.

For convenience, any reference herein to AC/DC and DC/AC converter blocks are for a direction of power flow from an onshore ac supply network to the subsea electrical loads. In other words, a DC/AC converter block will convert dc input to an ac output and an AC/DC converter block (or module) will converter an ac input to a dc output for a direction of power flow from the ac supply network to the subsea electrical loads.

An onshore AC/DC converter module 2 is connected to an ac supply network 4 by means of protective switchgear 6. The AC/DC converter module 2 converts the ac power from the ac supply network 4 into dc power and supplies it to a subsea dc transmission cable (or "tieback") 8. The dc transmission cable 8 can have any suitable construction and carries a transmission voltage of 50 kV.

A primary subsea power distribution unit (SPDU) 10 functions as a central power unit for the power distribution system and is connected to the subsea end of the dc transmission cable 8 by a wet mateable connector 12 or umbilical termination head. The primary SPDU 10 includes a DC/DC converter module 14 and a primary dc distribution network 16 that are located within a waterproof outer housing that is designed to withstand the appropriate subsea pressures. The outer housing will also contain any associated control circuitry and equipment (not shown) that is necessary for the normal operation of the primary SPDU 10.

The DC/DC converter module 14 acts as a step-down converter and provides dc power to the primary dc distribution network 16 which in this example carries a distribution voltage of 10-20 kV.

A series of secondary SPDUs are connected in parallel to the primary SPDU. Although FIG. 1 only shows two secondary SPDUs 18a and 18b it will be readily appreciated that any convenient number can be connected to the primary SPDU 10 within power rating limits and additional circuit breakers and dc transmission cables (see below) to enable such connections to be made are shown.

Each secondary SPDU 18a, and 18b includes a DC/DC converter module 20a and 20b and a secondary dc distribution network (or busbar) 22a and 22b that are located within a waterproof outer housing that is designed to withstand the appropriate subsea pressures. The outer housing will also contain any associated control circuitry and equipment (not shown) that is necessary for the normal operation of the secondary SPDUs 18a and 18b. The DC/DC converter modules 20a and 20b act as step-down converters and provide dc power to the secondary dc distribution networks 22a and 22b which in this example carry distribution voltages of 1-5 kVdc and 5-10 kVdc, respectively.

Each secondary SPDU 18a and 18b is connected to a primary SPDU 10 by means of a dc transmission cable 24 and an associated circuit breaker 26. Each circuit breaker 26 includes a compact off-load switch 28 located within a waterproof outer housing that is designed to withstand the appropriate subsea pressures. The outer housing will also contain any associated control circuitry and equipment (not shown) that is necessary for the normal operation of the circuit breakers 26.

The dc transmission cables 24 are connected to the secondary SPDUs and the circuit breakers 26 by wet mateable connectors 12. The circuit breakers 26 are also connected to the primary SPDU 10 by wet mateable connectors 12.

A pump load is connected to the secondary dc distribution network 22a by means of power converter 30. The power converter 30 includes a DC/AC converter unit 32 and off-load switch 34 provided within a waterproof outer housing that is designed to withstand the appropriate subsea pressures. The outer housing will also contain any associated control circuitry and equipment (not shown) that is necessary for the normal operation of the power converter 30. The power converter 30 is connected to the pump load and the secondary SPDU 18a by wet mateable connectors 12.

Two additional power converters 36 and 38 are also connected to the secondary dc distribution network 22a by wet mateable connectors 12. Power converter 36 includes a DC/DC converter unit 40 and provides a controlled dc power supply to which a suitable dc electrical load can be connected. Power converter 38 includes a DC/AC converter unit 42 and provides a controlled ac power supply to which a suitable ac electrical load can be connected.

Three independent compressor loads are connected to the secondary dc distribution network 22b by means of power converters 44. Each power converter 44 includes a DC/AC converter unit 46 and an off-load switch 48 provided within a waterproof outer housing that is designed to withstand the appropriate subsea pressures. The outer housing will also contain any associated control circuitry and equipment (not shown) that is necessary for the normal operation of the power converters 44. The power converters 44 are connected to the compressor loads and the secondary SPDU 18b by wet mateable connectors 12.

The wet mateable connectors 12 therefore provide a safe and reliable electrical connection between the following component parts of the power transmission and distribution system:

the dc transmission cable 8 and dc input terminals of the DC/DC converter module 14 of the primary SPDU 10;

the primary dc distribution network (or busbar) 16 and the off-load switches 28 of the circuit breakers 26;

the off-load switches 28 of the circuit breakers 26 and the dc transmission cables 24;

the dc transmission cables 24 and dc input terminals of the DC/DC converter modules 20a and 20b of the secondary SPDUs 18a and 18b;

the second dc distribution networks 22a and 22b and the off-load switches 34 and 48 associated with power converters 30, 36, 38 and 44; and the dc output terminals of the DC/DC converter unit 40 and the dc power supply, the ac terminals of the DC/AC converter unit 42 and the ac power supply, and the ac output terminals of the DC/AC converter units 32, 42 and 46 and the ac electrical loads (e.g. pump load and compressor loads).

Figure 2:
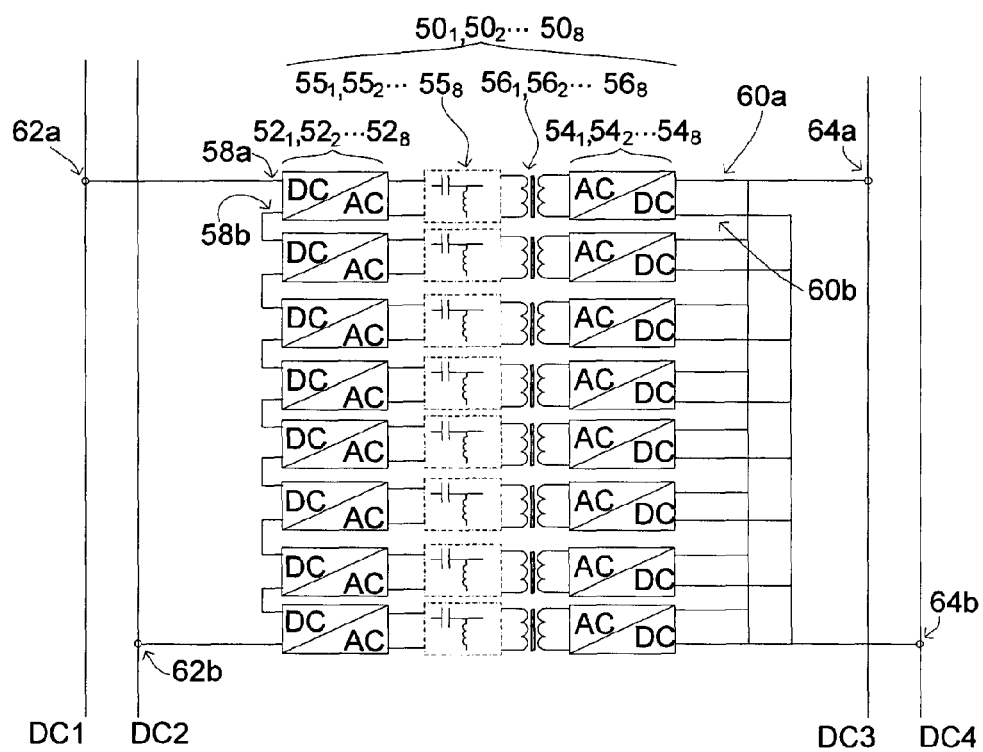
FIG. 2 is a schematic diagram showing how the DC/DC converter units of each DC/DC converter module are interconnected.
Figure 3:
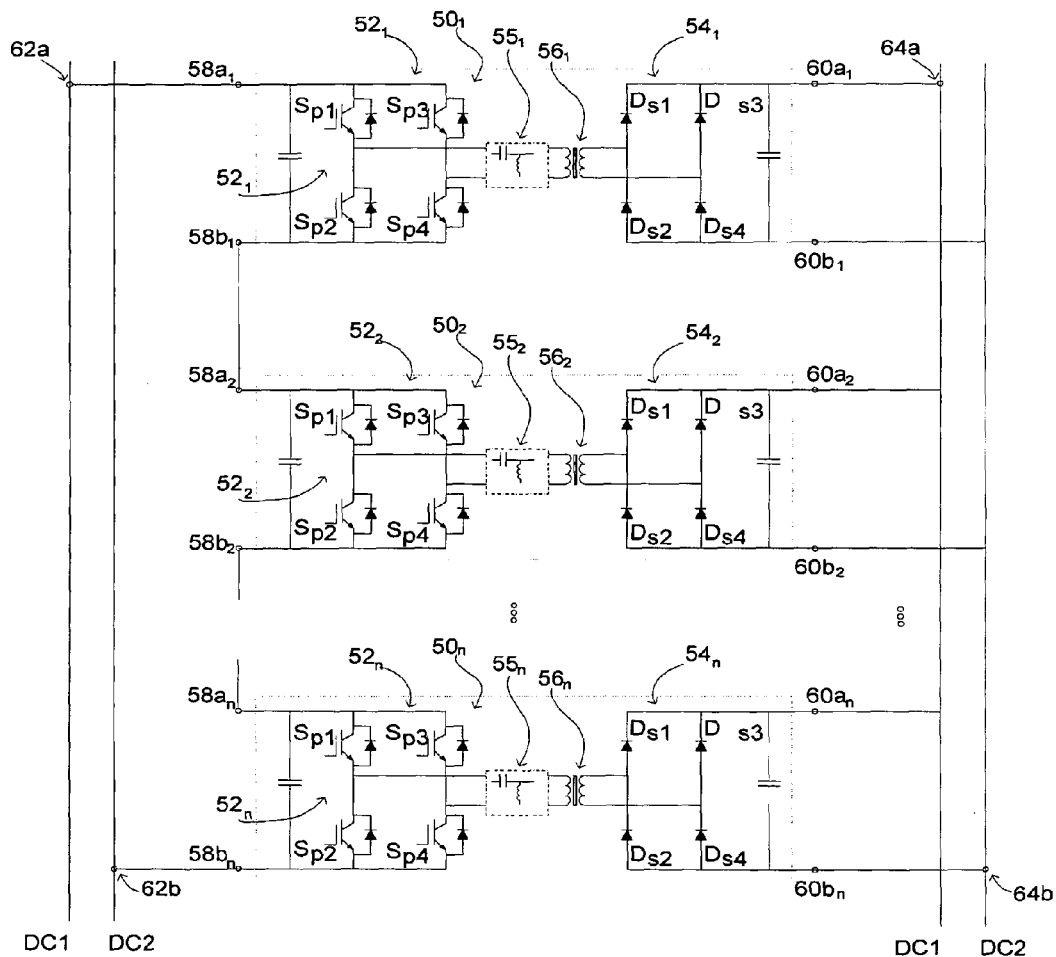
FIG. 3 is a schematic diagram showing a topology for the DC/DC converter units of each DC/DC converter module.

The DC/DC converter modules 14, 20a and 20b will now be explained in more detail with reference to FIGS. 2 and 3.

Each DC/DC converter module includes a series of DC/DC converter units 50. Each DC/DC converter unit 50 consists of a conventional full-H bridge DC/AC converter block 52 employing suitable power semiconductor switching devices Sp1 . . . Sp4 and a diode bridge 54 which operates as a passive rectifier. The DC/AC and AC/DC converter blocks 52 and 54 are provided on each side of a medium- or high-frequency transformer 56 which provides galvanic isolation. The DC/DC converter module will normally configured for unidirectional power flow (i.e. from the ac supply network to the subsea electrical loads) and there is no requirement for the AC/DC converter block 54 to provide an inverter function.

Each DC/DC converter unit 50 can be a zero-voltage-switched (ZVS) resonant converter or a zero-current-switched (ZCS) resonant converter such as a parallel-resonant type, for example.

Each DC/DC converter unit 50 includes a first pair of dc terminals 58a and 58b and a second pair of dc terminals 60a and 60b. The first pair of dc terminals 58a and 58b are defined by the dc terminals of each DC/AC converter block 52 while the second pair of dc terminals 60a and 60b are defined by the dc terminals of each AC/DC converter block 54. The ac terminals of each DC/AC converter block 52 are connected to an LC resonant tank 55 which in turn is connected to the primary windings of the transformer 56. The ac terminals of each AC/DC converter block 54 are connected to the secondary windings of the transformer 56.

The DC/DC converter units 50 of each DC/DC converter module are interconnected as described in more detail below. Although FIG. 2 shows eight DC/DC converter units 50 (i.e. n=8) it will be readily appreciated that the DC/DC converter modules may have any suitable number of DC/DC converter units depending on the design requirements.

The dc inputs of the DC/AC converter blocks 52 are interconnected in series (or cascade).

The first dc terminal 58a of the first DC/AC converter block 52 defines a first dc input terminal 62a for the DC/DC converter module and is connected to a first dc line DC1. With the exception of the DC/AC converter block $52_n$ that forms part of the last DC/DC converter unit $50_n$, the second dc terminal 58b of each DC/AC converter block 52 is interconnected in series to the first dc terminal 58a of the DC/AC converter block that forms part of the next DC/DC converter unit in the series. In other words, the second dc terminal $58b_1$ of the DC/AC converter block $52_1$ that forms part of the first DC/DC converter unit $50_1$ in the series is connected to the first dc terminal $58b_2$ of the DC/AC converter block $52_2$ that forms part of the second DC/DC converter unit $50_2$ in the series, the second dc terminal $58b_2$ of the DC/AC converter unit $52_2$ that forms part of the second DC/DC converter unit $50_2$ in the series is connected to the first dc terminal $58a_3$ of the DC/AC converter block $52_3$ that forms part of the third DC/DC converter unit $50_3$ in the series and so on. The second dc terminal $58b_{(n-1)}$ of the DC/AC converter block $52_{(n-1)}$ that forms part of the penultimate DC/DC converter unit $50_{(n-1)}$ in the series is connected to the first dc terminal $58a_n$ of the DC/AC converter block $52_n$ that forms part of the last DC/DC converter unit $50_n$ in the series.

The second dc terminal $58b_n$ of the DC/AC converter block $52_n$ that forms part of the last DC/DC converter unit $50_n$ in the series defines a second dc input terminal 62b of the DC/DC converter module and is connected to a second dc line DC2.

The dc output terminals of the AC/DC converter blocks 54 are interconnected in parallel.

The first dc terminals $60a_1$, $60a_2$. . . $60a_n$ of the AC/DC converter blocks $54_1$, $54_2$. . . $54_n$ are connected in parallel to define a first dc output terminal 64a for the DC/DC converter module. The second dc terminals $60b_1$, $60b_2$. . . $60b_n$ of the AC/DC converter blocks $54_1$, $54_2$. . . $54_n$ are connected in parallel to define a second dc output terminal 64b for the DC/DC converter module. The first dc output terminal 64a is connected to a third dc line DC3 and the second dc output terminal 64b is connected to a fourth dc line DC4.

In the case of the DC/DC converter module 14 for the primary SPDU 10 then the first and second dc lines DC1 and DC2 are the dc lines of the dc transmission cable 8 and the third and fourth dc lines DC3 and DC4 are the dc lines of the primary dc distribution network 16.

In the case of the DC/DC converter module 20a and 20b for each secondary SPDU 18a and 18b then the first and second dc lines DC1 and DC2 are the dc lines of the associated dc transmission cable 24 (which in turn are connected by means of the associated circuit breaker 26 to the dc lines of the primary dc distribution network 16) and the third and fourth dc lines DC3 and DC4 are the dc lines of the associated secondary dc distribution network 22a and 22b.

In the example shown in FIG. 1 the targeted power rating is up to 250 MW with a dc transmission cable 8 that is up to 200 km long. The primary and secondary SPDUs may be submerged at a depth of up to 3000 m. The load rating of each secondary SPDU may be up to 30 MW. Other practical arrangements are, of course, possible.

In use, high voltage (HV) or medium voltage (MV) carried by the dc transmission cable 8 is stepped down by the DC/DC converter module 14 of the primary SPDU 10 to a first distribution voltage (10-20 kV) that is subsequently supplied to a series of secondary SPDUs 18a and 18b through a primary dc distribution network 16. The secondary SPDUs are connected to the primary dc distribution network 16 by dc transmission cables 24 and associated circuit breakers 26. The first distribution voltage carried by the dc transmission cables 24 is stepped down by the DC/DC converter modules 20a and 20b associated with each secondary SPDU to respective secondary distribution voltages (1-5 kV and 5-10 kV) and supplied to a series of subsea electrical loads through secondary dc distribution networks 22a and 22b. The power transmission and distribution system has the transmission advantages of a conventional high voltage direct current (HVDC) arrangement but retains the flexibility of ac transmission systems because if uses a series of interconnected DC/DC converter units 50 that function as dc transformers. By using an optimized series/parallel combination of DC/DC converter units 50 the power transmission and distribution system can easily match any required voltage and power ratings.

In the event of an electrical fault in one of the subsea electrical loads then the off-load switch provided in the associated power converter can be used to isolate the load and permit continued use of the power distribution and transmission system. A specific electrical load or controlled power supply can also be selectively isolated for maintenance or repair purposes. Similarly, in the event of an electrical fault in one of the secondary SPDUs then the off-load switch provided in the associated circuit breaker 26 can be used to isolate the secondary SPDU from the primary SPDU 10 while power is still distributed to the remaining secondary SPDUs. The inherent fault current limited capacity of the DC/DC converter units 50 can assist with the interruption and isolation of any dc network faults.

The invention claimed is:

1. A power transmission and distribution system comprising:
- a primary dc transmission cable;
- a primary subsea power distribution unit having a DC/DC converter module connected between the primary dc transmission cable and a primary dc distribution network;
- a secondary subsea power distribution unit having a DC/DC converter module connected between the primary dc distribution network and a secondary dc distribution network;
- wherein each DC/DC converter module includes a series of interconnected DC/DC converter units, each including at least one DC/AC converter in communication with at least one AC/DC converter; and
- one or more subsea electrical loads connected to the secondary dc distribution network.

2. The power transmission and distribution system of claim 1, wherein the DC/DC converter module of the primary subsea power distribution unit operates as a step-down converter.

3. The power transmission and distribution system of claim 1, wherein the DC/DC converter module of the secondary subsea power distribution unit operates as a step-down converter.

4. The power transmission and distribution system of claim 1, further comprising a plurality of secondary subsea power distribution units each supplying power to an associated secondary dc distribution network.

5. The power transmission and distribution system of claim 4, wherein each secondary dc distribution network carries a different distribution voltage.

6. The power transmission and distribution system of claim 1, wherein the DC/DC converter module of at least one secondary subsea power distribution unit is connected to the primary dc distribution network by a secondary dc transmission cable and an associated subsea circuit breaker.

7. The power transmission and distribution system of claim 1, further comprising an onshore AC/DC converter module connected between an ac supply network and the primary dc transmission cable.

8. The power transmission and distribution system of claim 1, wherein the DC/DC converter modules are resonant DC/DC converter modules.

9. The power transmission and distribution system of claim 1, wherein the primary dc transmission cable is an HVDC transmission cable.

10. The power transmission and distribution system of claim 1, wherein each subsea electrical load is connected to the secondary dc distribution network by a respective power converter and an associated subsea circuit breaker.

11. The power transmission and distribution system of claim 1, further comprising one or more subsea electrical loads, each being connected to the primary dc distribution network by a respective power converter and an associated subsea circuit breaker.

12. The power transmission and distribution system of claim 1, wherein all electrical connections between component parts are made using wet mateable connectors or umbilical termination heads.

13. A power transmission and distributions system comprising:
- a primary dc transmission cable;
- a primary subsea power distribution unit comprising a first DC/DC converter module; and
- a secondary subsea power distribution unit including a second DC/DC converter module, the primary subsea power distribution unit and the secondary subsea power distribution unit being connected to each other via the first and second DC/DC converter modules;
- wherein each DC/DC converter module includes a series of interconnected DC/DC converter units each comprising at least one DC/AC converter in communication with at least one AC/DC converter; and
- wherein one or more electrical loads are directly connected to the primary subsea power distribution unit or are indirectly connected to the primary subsea power distribution via the secondary subsea power distribution unit.

* * * * *